Patented Dec. 22, 1953

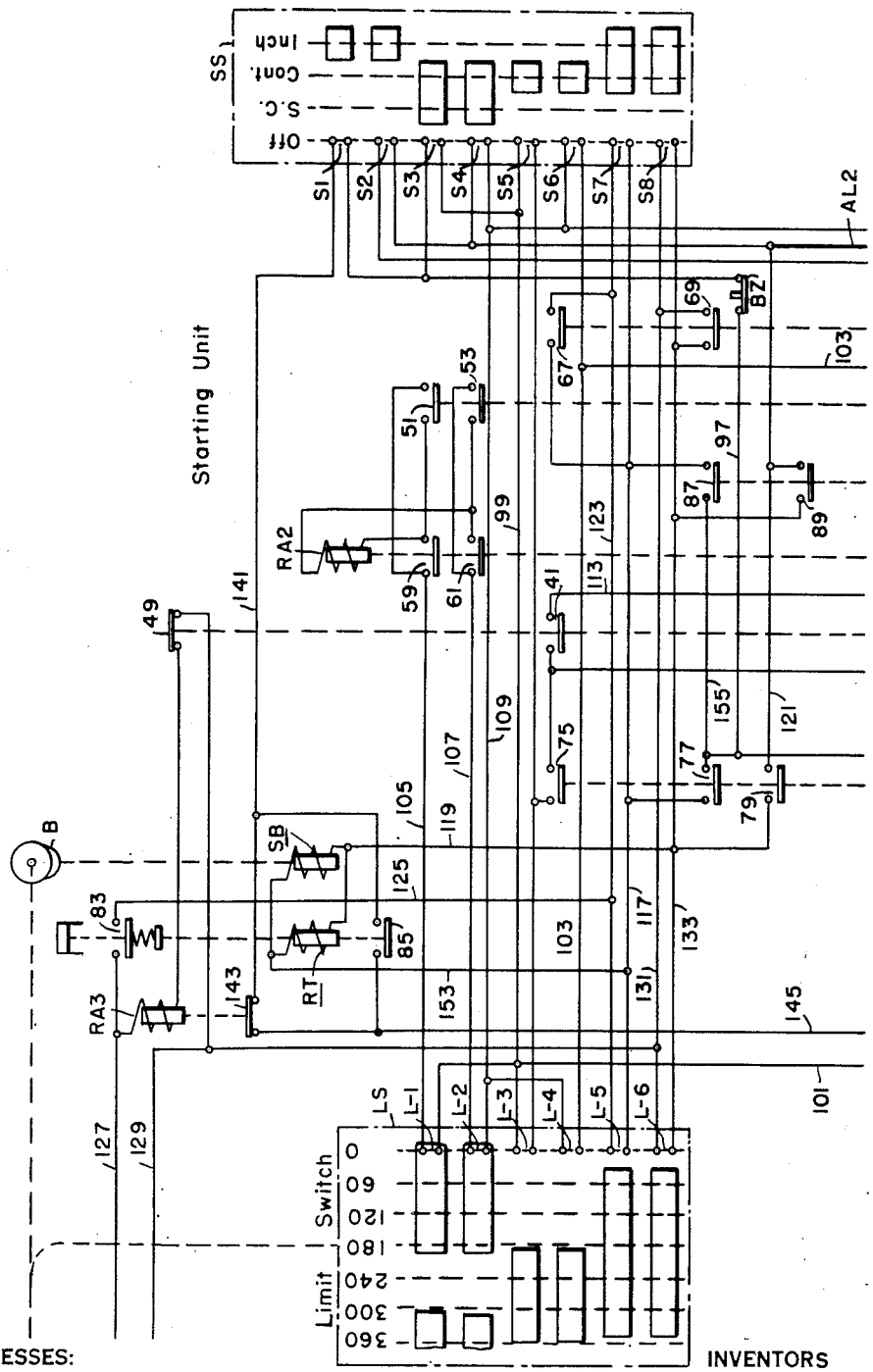

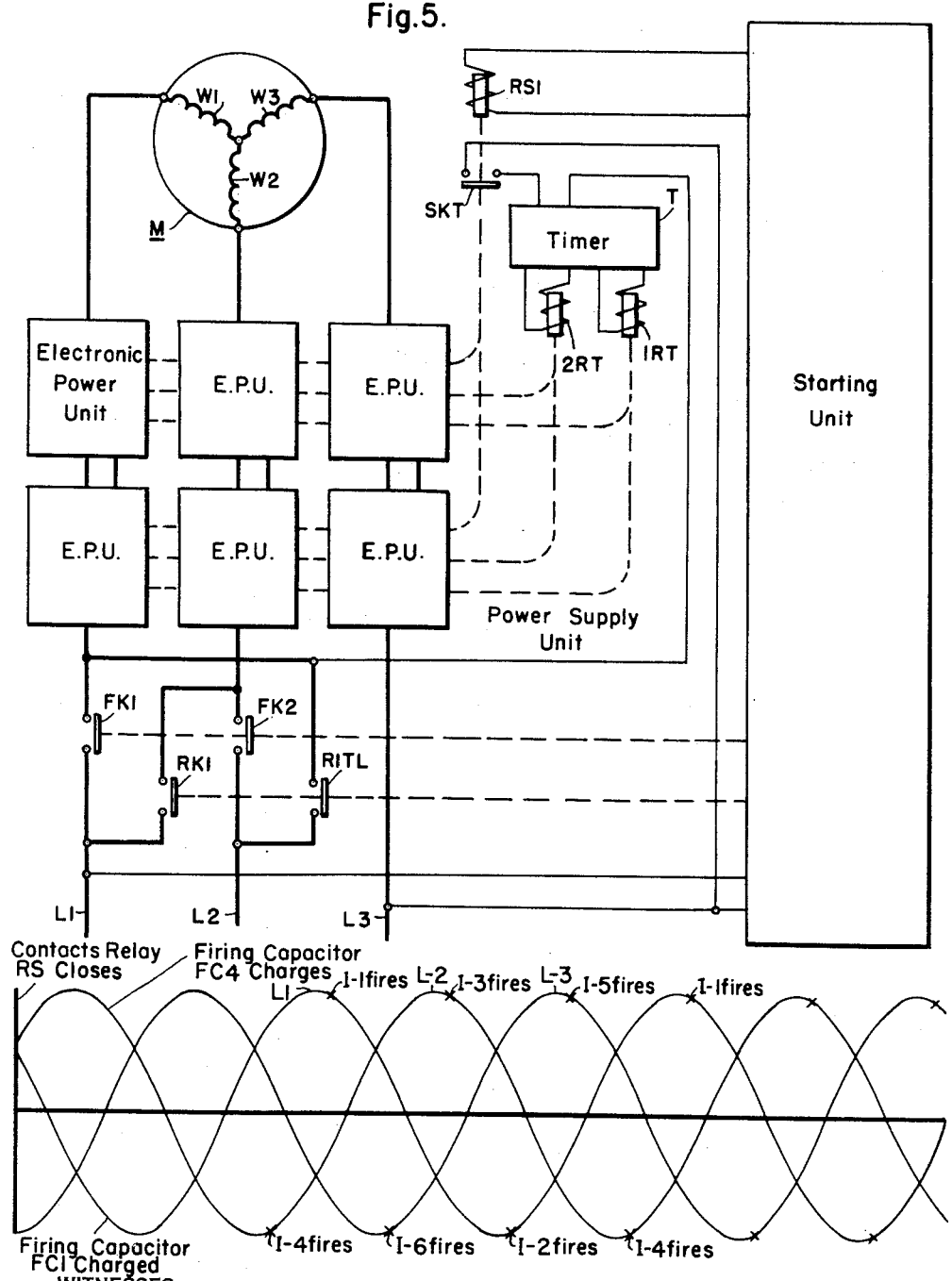

2,663,834

UNITED STATES PATENT OFFICE 2,663,834

ELECTRIC DISCHARGE APPARATUS FOR ALTERNATING CURRENT MOTORS

William E. Large and Robert F. Barrell, Lancaster, N. Y., assignors to Westinghouse Electric Corporation, East Pittsburgh, Pa., a corporation of Pennsylvania Application September 27, 1952, Serial No. 311,912

14 Claims. (Cl. 318—227)

Our invention relates to electric discharge apparatus, and has particular relation to apparatus for controlling a heavy duty polyphase motor. This application is a continuation-in-part of our application, Serial No. 122,694, filed October 21, 1949, and assigned to Westinghouse Electric Corporation.

The above-mentioned parent application discloses several embodiments of a motor drive including a heavy-duty polyphase motor such as that used in driving an automobile body press and electronic means for controlling the motor. The phase windings of the motor are, in each case, connected through anti-parallel electric discharge devices to the phase buses of a commercial supply and the discharge devices are controlled to attain the desired motor operation. Our present invention is the result of an extensive investigation conducted on the drive disclosed in the parent application.

A heavy duty motor such as is involved in our invention at a given voltage draws a high current in the locked rotor condition, that is, when it is starting. Such a motor when starting then imposes a heavy drain on its supply and where the supply is of limited capacity, as is the situation in many large cities both in the United States and abroad, the starting of the motor produces a large decrease in the potential of the supply which is objectionable to those deriving power from the supply. For example, the starting of a heavy duty motor in a shop in a complex industrial area such as mid-town Manhattan may cause fluorescent lights in a drafting room which are connected to the same limited supply as the motor to flicker.

Heavy duty motors which run continuously and are started only at relatively long intervals do not in the respect just discussed present a serious problem as motors, such as those driving automobile body presses, for example, which run intermittently. The latter must be started repeatedly at relatively short intervals and at each start they affect other apparatus on the supply. The intermittent motors and motors on related apparatus must also frequently be inched or jogged when the tool which they drive is being set up. Starting current is applied repeatedly to a motor operated in inch and the supply fluctuates correspondingly. Intermittently operated motors of large rating and motors of large rating frequently operated in inch controlled in accordance with the teaching of the prior art present so serious a problem to limited supplies that the utilities frequently bar or limit this use.

It is often also desirable to accelerate a heavy-duty motor at a predetermined rate. Such acceleration is not readily achieved with the apparatus available in accordance with the teachings of the prior art.

It is accordingly an object of our invention to provide apparatus for driving a heavy-duty motor which shall operate without producing objectionable fluctuations in the supply when the motor is starting.

Another object of our invention is to provide apparatus for driving a heavy-duty motor, which shall readily permit such a motor to be operated at the will of an operator, continuously, intermittently or in inch without producing objectionable fluctuations in the supply.

A further object of our invention is to provide apparatus for driving a heavy-duty motor which shall permit the driving of very large motors from power supplies of capacity insufficient or just sufficient to meet the starting current demands of the motors.

It is still another object of our invention to provide apparatus for driving a heavy-duty motor which shall include facilities for accelerating the motor at any desired rate over a reasonable range.

We have found that a heavy-duty motor drains far less current at a given voltage when running at its usual speed than during starting and we avail ourselves of this property of the motor in our invention. In accordance with our invention we provide motor drive apparatus which when the motor is operating in or near the locked rotor condition, automatically maintains the voltage on the motor at a substantially lower magnitude than the voltage of the supply, and as the motor speed increases automatically raises the motor voltage to the running magnitude. This object is accomplished by means of electric discharge devices which are interposed between the power supply and the motor and are so controlled by phase shift circuits as to supply the motor at the appropriate voltages. The phase shift circuits determine the instants in the half periods of the supply during which the discharge devices are to conduct when the discharge devices are fired. These discharge devices are usually ignitrons but they may be devices of other types. Hereinafter they are referred to as electric discharge paths. The word "path" is intended to include within its scope discharge devices having a plurality of main discharge paths in one envelope.

A contributing factor to our invention is the realization that the settings of the phase shift circuits need not cover a wide range or phase angle. This arises from the fact, as we have found, that the power factor of a heavy-duty motor decreases substantially as it passes from the locked rotor to its normal-speed running condition. In accordance with a specific aspect of our invention, then, the phase shift circuits may be set, once and for all, to fire the discharge devices at instants corresponding to the running power factor. When a motor in a drive which is so set is started, it operates at reduced voltage because its starting power factor is higher than its running power factor and as the speed of this motor increases, its voltage approaches full voltage as the power factor decreases. The voltage applied to the motor and its drain on the supply during starting is thus reduced and the motor may be started from a supply of limited capacity which is capable of supplying its running demands. The operation of the motor intermittently or in inch or in jog presents no serious problem.

In certain situations, it is desirable that the starting voltage be even smaller than the voltage corresponding to that produced by firing the discharge devices at instants corresponding to the running power factor. In accordance with a further aspect of our invention, we provide a control circuit for each of the discharge devices which includes means effective during starting for preventing each discharge device from being rendered conductive until an instant substantially later in the half periods than that corresponding to the running power factor of the motor. This preventing means is rendered ineffective when the motor comes up to normal speed and the discharge device is then fired to correspond to the running power factor of the motor. The control circuit may also include preventing means having a number of settings such that for each setting, the discharge device is rendered conductive at a different instant in any half period. We further provide in accordance with our invention means for changing these settings as the motor comes up to speed, so that as the motor comes up to speed the discharge devices are rendered conductive at earlier instants in the half periods of the supply and at full speed, full power is supplied to the motor. The change in the settings may be effected in response to the speed of the motor, or from a timing mechanism which changes the settings at predetermined instants corresponding to the different speeds of the motor. The former embodiment of our invention is used in situations in which the variation in speed of the motor is not entirely predictable as where the motor is started under load. The latter embodiment of our invention is used in situations in which the variation of the speed of the motor is predictable. Such a situation arises in motors which reach full speed before the load is applied to them, that is, before they execute the power stroke.

In apparatus in accordance with our invention which incorporates the facilities for changing the delay in the firing as the motor comes up to speed the range of the change is relatively small, of the order of a quarter of a period of the supply. This condition arises because one limit of the range is the running power factor angle by the motor which itself is of the order of 80°.

The novel features that we consider characteristic of our invention are set forth above. Our invention itself, however, both as to its organization and its method of operation together with additional objects and advantages thereof, will be understood from the following description of specific embodiments when read in connection with the accompanying drawings, in which:

Figures 1A through 1D together constitute a circuit diagram of a preferred embodiment of our invention;

Fig. 4 is another graph showing the operation of the power unit of Figs. 1A through 1D;

Fig. 5 is a diagram illustrating a modification of our invention.

Figure 1A:
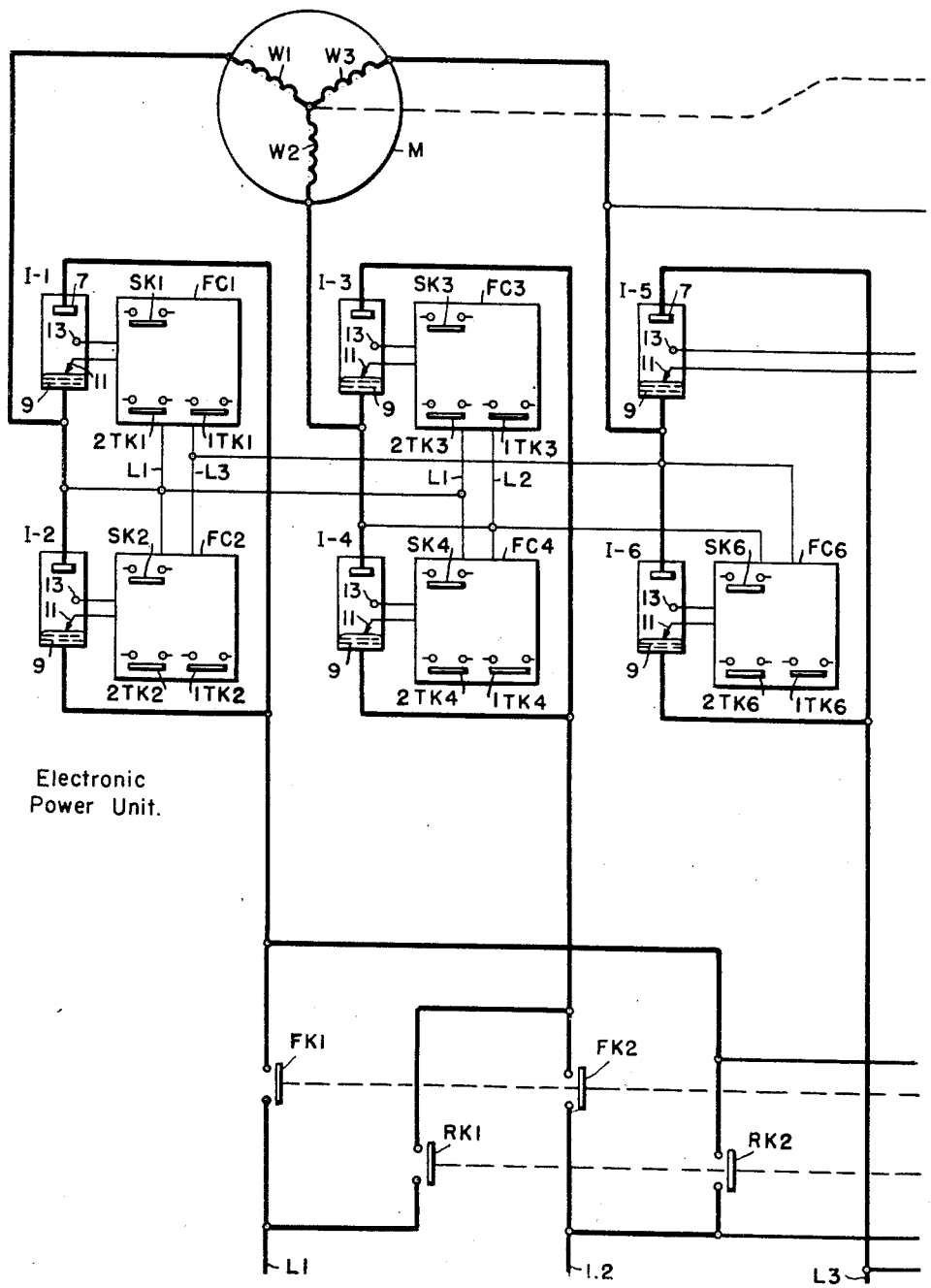
Figure 1B:
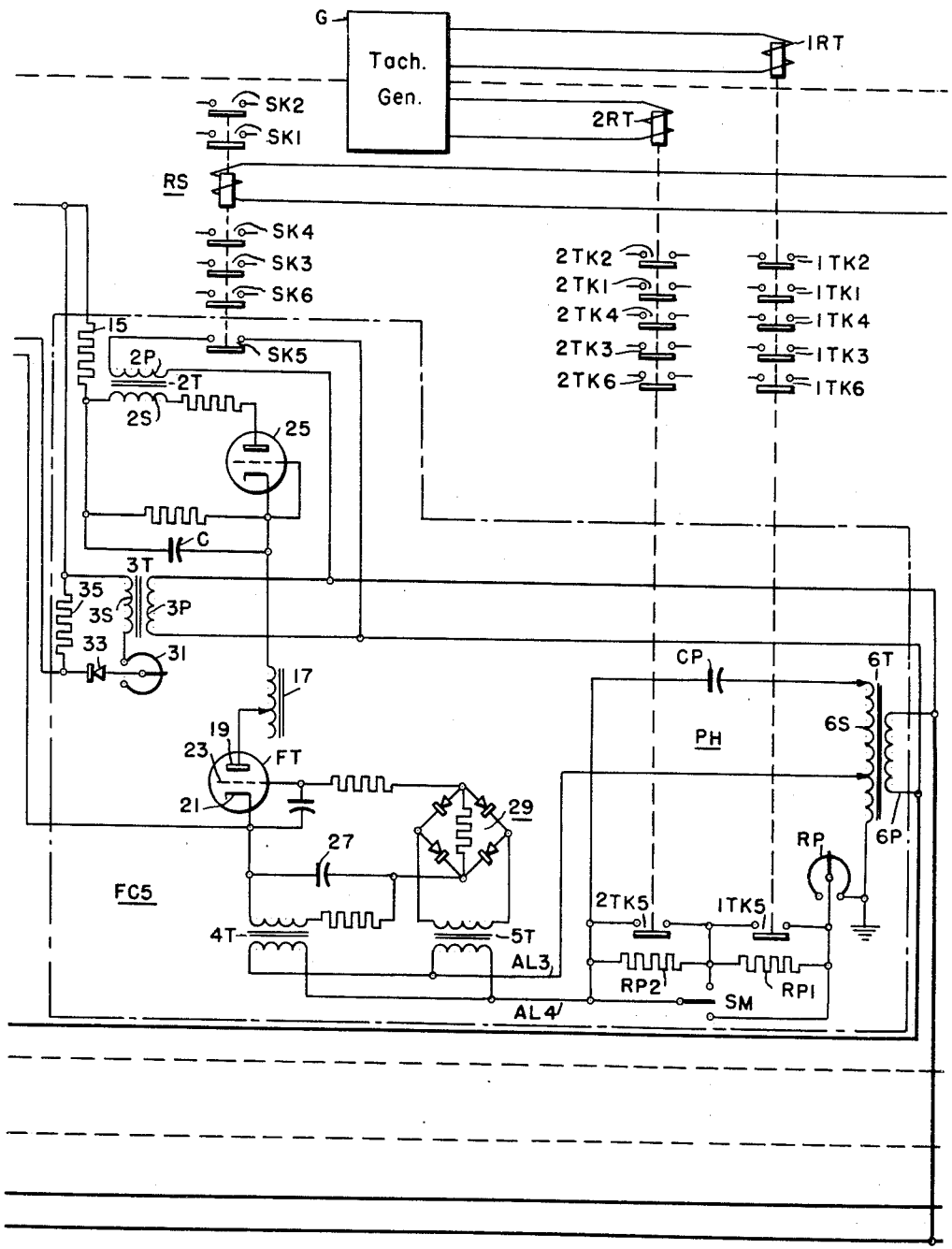
Figure 1D:
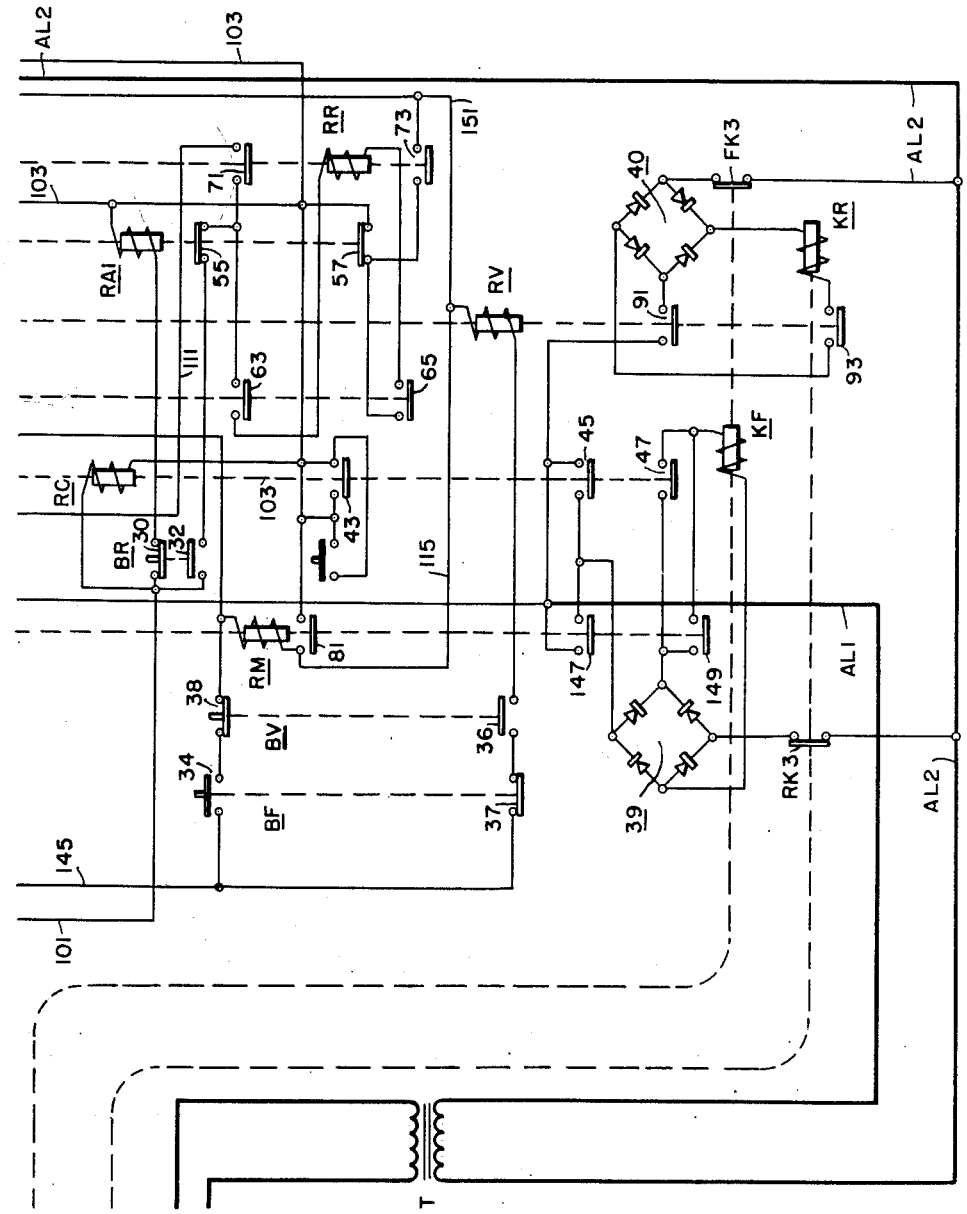

Description Fig. 1

The apparatus shown in Figs. 1A through 1D includes a polyphase heavy-duty motor M, an electronic power unit and a starting unit. The motor M and the power unit are supplied from the buses L1, L2 and L3 of a commercial three-phase supply. The starting unit is supplied from auxiliary buses AL1 and AL2 which are energized from a transformer 1T.

The motor M may be of the induction or synchronous type and it includes a plurality of phase windings W1, W2 and W3. In the motor shown in Figs. 1A through 1D, these phase windings are connected in Y. The windings may also be connected in delta, either directly or in the manner illustrated in Fig. 3 of our above-mentioned parent application.

The electronic power unit includes a plurality of pairs of ignitrons I-1, I-2; I-3, I-4; and I-5, I-6. Each ignitron has an anode 7, a cathode 9, an igniter 11 and an auxiliary anode 13. The ignitrons I-1 and I-2 are adapted to be connected in antiparallel between the bus L1 and the winding W1 through a contact FK1 of the contactor KF (see Fig. 1D) which is actuated when the motor M is to rotate in a forward direction or between the bus L2 and the winding W1 through the contact RK2 of a contactor KR which is actuated when the motor M is to rotate in the reverse direction. The ignitrons I-3 and I-4 are similarly adapted to be connected between the bus L2, through contact FK2, or bus L1, through contact RK1, to winding W2. Ignitrons I-5 and I-6 are directly connected between bus L3 and winding W3. The voltage applied to motor M is controlled by the conduction of the ignitrons, and may be low or high depending on the instant in the half periods of the supply at which the ignitrons are fired.

Each ignitron I-1 through I-6 is provided with a firing circuit FC1 through FC6. These firing circuits are alike for all ignitrons and only one, FC5, is shown in detail. The firing potential is derived from a capacitor C which we may call a firing capacitor which is connected to the cathode 9 of the corresponding ignitron I-5 through a resistor 15 and to the igniter 11 through a thyratron FT which we may call a firing thyratron and a peak-limiting reactor 17. The thyratron FT has an anode 19, a cathode 21, and a control electrode 23. The capacitor C is connected through the reactor 17 to the anode 19 and the cathode 21 is connected to the igniter 11.

The capacitor C is adapted to be charged through a rectifier 25. The power for charging the capacitor C is derived from a selected pair of buses of the supply through a transformer 2T. In the case of firing thyratron FT for ignitron I-5 one of these buses is L3, the other bus is L1 or L2 depending on whether the forward contactor KF or the reverse contactor KR is actuated. The primary 2P of the transformer 2T is adapted to be connected to the buses through normally open contacts SK5 of a relay RS which we shall call the starting relay. This relay is controlled from the starting unit and has a plurality of normally open contacts SK1 through SK6, one each for each firing circuit FC1 through FC6 respectively. One of these contacts is connected in the supply to the primary 2P of a charging circuit for each of the ignitrons.

The firing of an ignitron is effected by discharging the capacitor C through the thyratron FT. The arc is first picked up by the auxiliary anode 13 and transferred from it to the main anode 7. The auxiliary anode is supplied through a transformer 3T from the same buses as the corresponding firing capacitor C. The secondary 3S of this transformer is connected between the auxiliary anode 13 and the cathode 9 through a variable resistor 31 and a rectifier 33 and the auxiliary anode and cathode are shunted by a fixed resistor 35.

The transformer 2T of each charging circuit and the transformer 3T are so connected to the corresponding supply buses that the corresponding firing capacitor C is charged during the half periods during which the auxiliary-anode-cathode potential of the corresponding ignitron is negative. The capacitor C for each ignitron is thus ready to be discharged when the auxiliary-anode-cathode potential of the corresponding ignitron is positive. The main-anode-cathode potential of each ignitron depends on the main-anode-cathode potential of other ignitrons since the main-anode-cathode paths of certain ignitrons are in series. But the polarities of the main-anode-cathode potentials are such that each ignitron may in its turn conduct during an interval when its auxiliary-anode-cathode potential is positive.

Between the control electrode 23 and the cathode 21 of each firing thyratron FT, a composite potential is impressed. This potential is derived from a pair of conductors AL3 and AL4 through transformers 4T and 5T and consists of an alternating potential derived from transformer 4T and impressed across a capacitor 27 and a potential derived from transformer 5T through a rectifier 29. The rectifier output is unfiltered and the rectifier 29 is so connected as to impress inverted rectified pulses in the control circuit. This inverted rectified potential has a wave form consisting of a succession of loops interposed between cusps which occur at the instant of zero potential of the alternating potential derived from transformer 4T. The cusps provide potentials of short duration for rendering conductive the firing thyratrons FT when the alternating potential is of proper magnitude.

The conductors AL3 and AL4 which supply the control potential to the firing thyratron FT are themselves supplied from a transformer 6T, the primary 6P of which is connected across two of the buses L1 or L2 and L3 depending on the condition of the contactors KF and KR. The secondary 6S of this transformer has a pair of terminal taps and an intermediate tap. To one terminal tap a capacitor CP which may be called a phase shift capacitor is connected; to the other terminal tap, a variable resistor RP is connected in series with a pair of fixed resistors RP1 and RP2. The resistors RP, RP1 and RP2 may be called phase shift resistors. The conductors AL3 and AL4, which supply the primaries 4P and 5P of the transformers 4T and 5T, are connected between the junction of the capacitor CP and the fixed resistor RP2 and the intermediate tap of the secondary 6S.

The fixed resistors RP1 and RP2 may be shunted out by contacts 1TK5 and 2TK5 of a pair of relays 1RT and 2RT respectively. These relays are connected to be energized from a tachometer generator G driven by the motor M. Under certain circumstances, one or both of the resistors may also be shunted out by a manual switch SM.

We shall call the circuit including capacitor CP and resistors RP, RP1 and RP2 a phase shift circuit and label it PH. The potential impressed by the circuit PH across the primaries of the transformers 4T and 5T is displaced in phase with reference to the potential of the buses L1 or L2 and L3 from which the transformer 6T is energized by a phase angle which is dependent on the magnitude of the capacitor CP, the setting of the variable resistor RP, and the magnitudes of the fixed resistors RP1 and RP2. This phase shifted potential is impressed through the transformers 4T and 5T in the control circuit of the firing thyratron FT. The composite potential impressed in the control circuit of the firing thyratron is then composed of an ordinary sinusoidal potential having a phase relationship to the potential from the buses as determined by the phase shift circuit PH and a potential of cusp wave form, the cusps of which coincide with the points at which the sinusoidal potential passes through zero. This composite potential has a magnitude sufficient to render conductive the firing thyratron FT during a short time interval (coinciding with alternate cusps) of each period of the supply. The phase of the potential derived from transformer 5T and the setting of the capacitor CP and the resistors RP, RP1 and RP2 are such that this short interval occurs during the half periods following those in which the firing capacitor is charged. The instants when the firing thyratron FT is rendered conductive also occur while the potential from the supply which is impressed between the auxiliary anode 13 and the cathode 9 of the associated ignitron (I-5) is positive. Firing potential is thus impressed on each ignitron at a certain instant in its positive half period of auxiliary-anode potential as determined by the setting of the resistors in the phase shift circuit PH. The ignitrons I-1 through I-6 are so connected that the main anode potential of each is positive during a large proportion of the interval during which the auxiliary-anode potential is positive.

The firing circuit for only one ignitron, I-5, is shown. The firing circuits for the others are identical. In each case the firing potential is derived from a capacitor C which is charged from a transformer 2T, the primary circuit of which is closed by a contact SK1, 2, 3, 4 or 6 of the starting relays RS when the motor M is to be rotated. In each case a thyratron FT controlled from a phase shift circuit is provided for discharging the capacitor C at a predetermined instant and this circuit includes a plurality of fixed resistors RP1 and RP2 adapted to be shunted out by contacts 1TK1, 2, 3, 4 or 6 and 2TK1, 2, 3, 4 or 6 of relays 1RT and 2RT actuable from a tachometer generator G. In each case, the arc may be picked up by the auxiliary anode 13 which is positive when the firing current flows.

Figure 2:
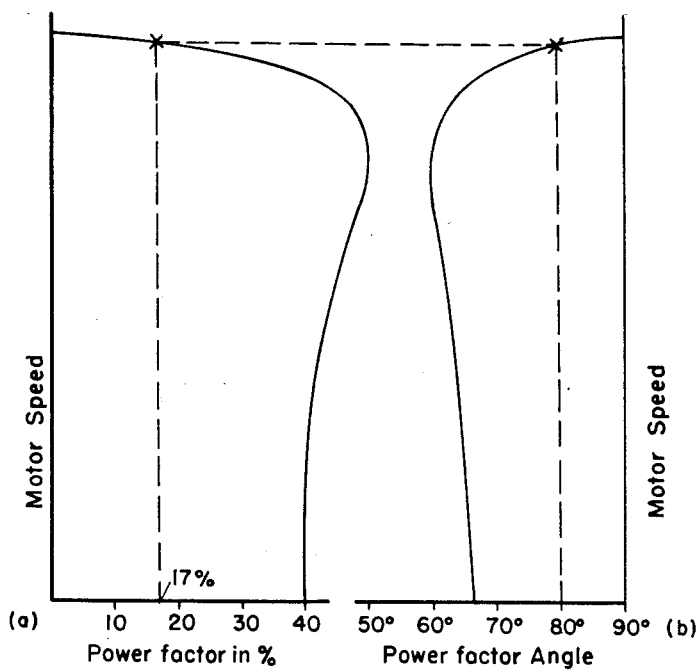
Figs. 2 and 3 are graphs showing the characteristics of the motor of Figs. 1A through 1D.

The phase shift circuit PH which supplies the control circuit of the thyratron FT in each firing circuit FC1 through FC6 constitutes an important feature of our invention. The importance of this feature will now be explained, with reference to Figs. 2 and 3. Fig. 2 presents two graphs, (a) and (b), which show the speed-power-factor characteristics of motor M. In graph (a), the motor speed is shown as a function of the power factor; in graph (b), it is shown as a function of the power-factor angle, that is, of the angle of lag of the motor current with reference to the potential impressed thereon. These graphs are plotted for a typical heavy-duty motor M.

As can be seen, the power factor of the motor varies from approximately 40% at zero speed to 17% at a running speed indicated by a cross on graph (a). The corresponding power factor angle varies from a lag of 66° to a lag of 80° at running speed as shown on graph (b).

Figure 3:
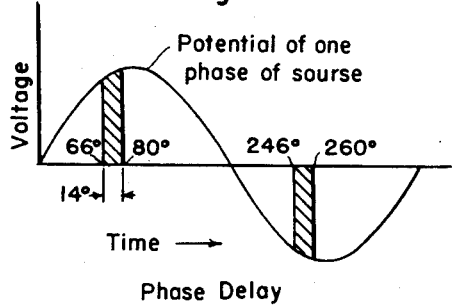

In Fig. 3 voltage is plotted vertically and time horizontally. In this graph, the sine wave represents the voltage of one phase of the source L1, L2, L3. The shaded areas between the phase angles 60° and 80° and 246° and 260° represents the range of variation of the power-factor angle as the motor speed varies from zero to the running speed. As can be seen, this range extends over approximately 14°, from approximately 66° at zero speed to 80° at full speed.

Figure 3 shows that the speed-power-factor characteristic of the motor M makes available a facility for starting the motor at a lower voltage than the voltage at which it operates. The motor M may be started at a phase angle corresponding to its running power-factor angle, that is, at a phase angle of 80°. Since the starting power-factor angle of the motor is 66°, the motor so started is supplied at a reduced voltage. As the motor comes up to speed, its power-factor angle approaches the starting angle and full power is supplied to it. The starting as just explained is effected by firing the ignitrons I-1 through I-6 through which the motor is supplied at the appropriate angle in their positive half periods, which in the case illustrated, would be at an angle of 80° following the instant of zero potential.

In accordance with one aspect of our invention, the thyratrons are set to supply the motor M at a starting angle corresponding to its running power-factor angle. This object is accomplished by setting the phase shifting circuit at the proper setting. In situations where the reduction in voltage attained in this manner is adequate, only the variable resistor RP and the capacitor CP need be connected in each phase shift circuit PH. Under such circumstances, the two fixed resistors, RP1 and RP2 may be shunted out by the manual switch SM.

In other situations, the voltage available by setting at the running power-factor angle is not sufficiently low for starting. Under such circumstances, a plurality of resistors such as the two fixed resistors RP1 and RP2 in the phase shift circuit may be added. These resistors are of such magnitude as to delay the starting by an angle substantially greater than the running-power-factor angle. The delay is sufficient to enable the motor M to be started or to be inched without materially affecting the output voltage of the supply. When the motor M is to be inched, the fixed resistors RP1 and RP2 remain in the circuit during the inching and the motor is operated in inch at reduced voltage. When the motor M is to operate continuously, facilities are provided for shunting out the resistors as the motor comes up to speed. Such facilities are the relays 1RT and 2RT which are energized from the tachometer generator G and progressively shunt out the fixed resistors so that eventually the motor M operates at full speed with full power supplied thereto.

With these resistors RP1 and RP2 in the circuit, the variable resistor RP is set so that when the resistors RP1 and RP2 are shunted out the phase shift circuit PH causes the ignitrons to conduct at the full speed-power-factor angle in the half periods of the potential impressed. Thus the shift in the angle of firing effected by shunting out the fixed resistors RP1 and RP2 is relatively small, of the order of ⅓ or ¼ of a period.

The starting unit controls the operation of the motor M. This unit includes a selector switch SS which selects the mode of operation of the motor M and has contacts S1, S2, S3, S4, S5, S6, S7 and S8. One of three modes may be selected, depending on the setting of the switch SS. The motor M may be operated only for a single cycle; it may be operated continuously; or it may be inched.

The single-cycle operation is controlled by a limit switch LS having six contacts L-1 through L-6. The limit switch LS is actuated by the motor as it rotates, through gears (not shown) and stops the rotation at the end of a cycle. During continuous operation, the contacts L-3 through L-6 are shunted by contacts S5, S6, S7, S8 of the selector switch SS. If desired, the switch LS may be driven through reduction gears so that motor M executes a number of complete revolutions during single-cycle operation.

The selector switch SS is set to start whatever operation of motor M is desired. To start the motor in single-cycle or continuous operation once the selector switch SS is set, a run button BR is provided. This button has a normally closed contact 30 and a normally open contact 32.

When the selector switch SS in set for inch, the forward inching operation is controlled by forward inch button BF and the reverse inch operated by a corresponding button BV. Each of these buttons BF and BV has a normally open contact 34 and 36 respectively and a normally closed contact 27 and 38 respectively, a normally open contact 34 and 36 of one button being connected in series with a normally closed contact of the other 38 or 37 so that the buttons are interlocked and actuation of one renders the other ineffective.

The starting unit also includes the forward contactor KF and the reverse contactor KR. These contactors are adapted to be energized from rectifiers 39 and 40 respectively which are supplied from the buses AL1 and AL2. In addition to the contacts FK1 and FK2 the forward contactor includes a contact FK3 in the energizing circuit of the rectifier 40. This contact FK3 is open when contactor KF is energized and prevents contactor KR from being energized. Contactor KR includes a similar normally closed contact RK3 in the energizing circuit for the rectifier 39.

The starting unit further includes a main control relay RC. The main control relay RC has four normally opened contacts 41, 43, 45 and 47 and one normally closed contact 49. Two of the normally opened contacts 45 and 47 are connected in a circuit with the exciting coil of the forward contactor KF and the rectifier 39 and when the relay RC is energized, energy is supplied to the coil of contactor KF from the rectifier 39. The contactor KF is then energized, closing the forward contacts FK1 and FK2 in series with the ignitrons I-1 and I-2 and I-3 and I-4. The other contacts 41, 43 and 49 of the relay RC are connected in circuits so as to advance the sequence of operations carried out in starting the motor.

There are also a pair of auxiliary relays RA1, RA2. The relay RA1 has two normally open and two normally closed contacts 51, 53 and 55 and 57 respectively. The normally open contacts 51 and 53 are connected in a circuit with the coil of an auxiliary relay RA2 and this relay is energized when the auxiliary relay RA1 is energized. The contacts 55 and 57 are connected to advance the starting operation. The relay RA2 has four normally open contacts 59, 61, 63 and 65. Two of these contacts, 59 and 61, are connected to lock relay RA1 in the energized condition; the other two to advance the sequence of the starting operation.

Still another relay RR is provided. This relay is actuated by the run button BR, and it is connected to be energized through a pair of the normally open contacts 63 and 65 of the auxiliary relay RA2. The relay RR has four normally open contacts 67, 69, 71 and 73. Through two of these contacts 71 and 73 another relay RM which we may call the motor releasing relay is energized. The other contacts 67 and 69 are connected to control the running of the motor.

The relay RM has six normally open contacts 75, 77, 79, 81, 147 and 149. Through two of these contacts 77 and 79 the brake solenoid SB is energized, to release the brake for the motor M, and the timer relay RT is energized. Through the other contacts 75 and 81, the relay RM is locked in energized condition. The timer relay RT has two normally open contacts 83 and 85. Through one the starting relay RS is energized; the other functions during the inching operation.

The starting unit also includes a further relay RV which is actuated during the inching in reverse. This relay includes four normally open contacts 87, 89, 91 and 93. At two of these (91 and 93) the energizing circuit through the exciting coil of the reversing contactor KR is closed through the rectifier 40. The other two, 87 and 89, advance the starting operation.

Standby—Single cycle

For single cycle operation, the selector switch SS is set with contacts S3 and S4 closed, and contacts S1, S2, S5, S6, S7 and S8 open. With the contacts S5, S6, S7 and S8 open, the limit switch LS is effective. With the motor M at rest, this limit switch is in a position in which contacts L-1 and L-2 are closed and contacts L-3, L-4, L-5 and L-6 are open.

With the selector switch SS and the limit switch LS set as described, a circuit is closed through the coil of the main control relay RC. This circuit extends from the bus AL1 through a conductor 97, a stop button BZ, contact S3, a conductor 99, a conductor 101, the coil of relay RC, a conductor 103, contact S4 to bus AL2. Relay RC is, therefore, energized. Another circuit extends through the coil of auxiliary relay RA1 from bus AL1 through the conductor 97, the stop button BZ, contact S3, the conductor 99, the conductor 101, the normally closed contact 30 of the run button BR, the coil of relay RA1, the conductor 103, contact S4 to the bus AL2.

Relays RC and RA1 then pick up. At the two now closed contacts 45 and 47 of relay RC, the forward contactor KF is energized, closing its normally open contacts FK1 and FK2 in the electronic power unit and conditioning the unit to energize motor M. The contactor KF also opens its normally closed contact FK3 in the energizing circuit for the reversing contactor KR, thus preventing the operation of the latter. At this point, then, the auxiliary anodes 13 of the ignitrons I-1 through I-6 are supplied with potential and through the transformers 3T and the transformers 2T are conditioned to supply charging potential to the capacitor C.

Through the now closed contacts 51 and 53, of the auxiliary relay RA1, current is applied through the exciting coil, of the auxiliary relay RA2 and the latter is energized. This current is supplied in a circuit extending from the auxiliary bus AL1 through the conductor 97, the stop button BZ, contact S3, the conductor 99, contact L-1, a conductor 105, the now closed contact 51 of the auxiliary relay RA1, the exciting coil of the auxiliary relay RA2, the now closed contact 53, a conductor 107, the contact L-2, a conductor 109, the contact S4 to the bus AL2. The relay RA2 then picks up.

The starting unit is now conditioned for single cycle operation.

Operation—Single cycle

After the starting unit is set for single cycle operation, the motor M is started by actuating the run button BR, thus opening its normally closed contact 30 and closing its normally open contact 32. By the opening of the normally closed contact 30, the auxiliary relay RA1 is deenergized and drops out. But the other auxiliary relay RA2 remains locked in energized position through a pair of its now closed contacts 59 and 61 and through the contacts L-1 and L-2.

At the closed contact 32 of the run button BR, a circuit is closed through the exciting coil of the relay RR. This circuit extends from the auxiliary bus AL1 through the conductor 97, the stop button BZ, the contact S3, the conductor 99, the conductor 101, the now closed contact 32 of the run button, the now reclosed contact 55 of the auxiliary relay RA1, the now closed contact 63 of the auxiliary relay RA2, the exciting coil of the relay RR, another now closed contact 65 of the auxiliary relay RA2, a now reclosed contact 57 of the auxiliary relay RA1, contact S4 to auxiliary bus AL2. Relay RR now picks up. At its now closed contacts 71 and 73, this relay closes a circuit through the exciting coil of the motor release relay RM. This circuit extends from the auxiliary bus AL1 through the conductor 97, the stop button BZ, contact S3, the conductors 99 and 101, the now closed contact 32 of the run button BR, the now closed contact 55 of the auxiliary relay RA1, a now closed contact 71 of the relay RR, the conductor 111, the now closed contact 41 of the relay RC, a conductor 113, the exciting coil of the relay RM, a conductor 115, the now closed contact 73 of the relay RR, the now reclosed contact 57 of the relay RA1, the conductor 103, the contact S4 to the bus AL2. The relay RM is now energized and at its now closed contacts 75 and 77 closes a circuit through the brake solenoid SB, and also a parallel circuit through the coil of the timer relay RT. These circuits extend from the auxiliary bus AL1 through a now closed contact 77 of the relay RM, a conductor 117, the brake solenoid SB, and the winding of the timer relay RT, a conductor 119, a now closed contact 79 of the relay RM, a conductor 121 to the bus AL2. The brake B is now released and the timer relay RT times out.

The timer relay RT is set to time out in approximately two seconds. At this time, the motor brake B is entirely released. When the timer relay times out, it closes one of its normally open contacts 83, closing a circuit through the exciting coil of the starting relay RS. This circuit extends from the auxiliary bus AL1 through the now closed contact 77 of the relay RM, a conductor 117, a now closed contact 67 of the relay RR, a conductor 123, a conductor 125, the now closed contact 83 of the timer relay RT, a conductor 127, the exciting coil of the starter relay RS, a conductor 129, a conductor 131, another now closed contact 69 of the relay RR, a conductor 133, another now closed contact 79 of the relay RM, the conductor 121 to the auxiliary bus AL2.

The relay RS is now energized closing its contacts SK1 through SK6 in series with the primaries 2P of the transformers 2T which charge the firing capacitors C. The capacitors are then charged during the half periods during which the auxiliary-anode-cathode potential on the associated ignitrons I-1 through I-6 are negative. During the half periods during which the auxiliary-anode-cathode potential are positive, the firing thyratrons are rendered conductive at instants predetermined by the setting of the variable resistor RP and the magnitudes of the fixed resistors RP1 and RP2. These instants are late in the half period for each ignitron and as each of the ignitrons is in its turn rendered conductive, current is supplied at reduced potential to the windings W1, W2, W3 of the motor M.

The manner in which the ignitrons I-1 through I-6 fire may be understood with the help of Figure 4. In this view, voltage is plotted vertically and time, horizontally. The interlaced sine curves represent the voltage of each of the buses L1, L2 and L3 relative to an artificial neutral, for example, the junction of the windings W1, W2, W3 of the motor M. Each of the sine curves then represents the voltage impressed between the corresponding supply bus (L1, L2, or L3) and this junction. The voltage impressed across the ignitrons I-1 through I-6 when the latter are non-conductive is made up of combinations of the voltages represented by the sine curves. Thus when the ignitrons are non-conductive the anode 7 of I-1 is at the potential of bus L1 and the cathode 9 of I-6 at the potential of bus L3. Similarly the anode 7 and cathode 9 of ignitrons I-3 and I-2 respectively are at the potentials of buses L2 and L1 respectively and the anode 7 and cathode 9 of ignitrons I-5 and I-4 respectively are at the potentials of buses L3 and L2 respectively. These potential differences are of interest because at any instant when motor M is being energized current flows in series through the ignitrons I-1 through I-6, and the potentials described are the potentials under which the current flows.

The auxiliary-anode circuits are energized individually and not in series. Thus, since contactor KF is energized, potential between the auxiliary anodes 13 and the cathodes 9 of ignitrons I-5 and I-6 is derived for each ignitron directly from the buses L1 and L3; that for ignitrons I-3 and I-4 from the buses L2 and L3; and that for ignitrons I-1 and I-2 from the buses L1 and L2.

It may be assumed that the contacts SK1 of the starting relay RS close at an instant represented by the vertical line on the left of Fig. 5. It may also be assumed that the firing circuits FC1 through FC6 for each of the igniters are set to supply igniter current at an angle represented by the small crosses on the corresponding curves. Under such circumstances, the firing capacitor C of the firing circuit FC4 is charged during the positive half period represented by the positive loop on the extreme left. Igniter current then first flows through the igniter 11 of ignitron I-4. While igniter current is flowing, secondary 3S of firing circuit FC4 impresses a positive potential between the auxiliary-anode 13 and cathode 9 of ignitron I-4 and an auxiliary arc is produced. Current then flows from one terminal of the associated secondary 3S through the variable resistor 31, the rectifier 33, the auxiliary anode 13 and the cathode 9 of ignitron I-4 to the other terminal of the secondary 3S. The ignitron I-4 is then in a condition to conduct if the proper potential is supplied to the anode. But this potential is not at the moment supplied since none of the other ignitrons I-1 to I-3, I-5 and I-6 are conductive, and for the moment current continues to flow through the above-traced circuit.

In the meantime, the capacitor C of firing circuit FC1 has charged during the interval represented by the negative loop on the left of Fig. 4. Igniter current is then supplied to the ignitron I-1 at the instant corresponding to the cross on the succeeding positive loop, and an arc is produced at the auxiliary anode 13 of the latter. Current may now flow through ignitrons I-1 and I-4 and since both ignitrons are in condition to conduct, current flows from bus L1 through contact FK1, ignitron I-1, phase windings W1 and W2 of motor M, ignitron I-4, contact FK2 to bus L2. It is seen that the direction of the current is from the phase terminal of winding W1 towards the neutral and from the neutral to the phase terminal of winding W2.

While current is thus flowing through windings W1 and W2, ignitron I-6 is supplied with firing current at an instant corresponding to the cross on its curve, and is rendered conductive (⅙ of a period after ignitron I-1). Current now begins to build up in a circuit including winding W3. This circuit extends from bus L1 through contact FK1, ignitron I-1, windings W1 and W2, ignitron I-6 to bus L3. Current is now flowing from the phase terminal of W1 to the neutral and from the neutral to the phase terminals W2 and W3. The current in winding W3 is building up and in W2 is decaying and eventually the current through the latter drops to zero.

One-sixth of a period after ignitron I-6 was rendered conductive igniter current is supplied to the ignitron I-3. If ignitron I-4 is still conductive, current at this time flows through the auxiliary-anode circuit of ignitron I-3, and ignitron I-3 becomes conductive after ignitron I-4 has become non-conductive. If ignitron I-4 is non-conductive when the igniter current is supplied to ignitron I-3, ignitron I-3 becomes conductive at once. In either event, current builds up in a circuit extending from bus L1 through contact FK2, ignitron I-3, phase windings W2 and W3 and ignitron I-6 to bus L3.

The current in winding W2 in a direction from its terminal to the neutral is now building up and the current in winding W1 from the terminal to the neutral is decaying. The next ignitron to conduct is I-2. It conducts after ignitron I-1 becomes non-conductive and current flow in a circuit extending from bus L2 through contact FK2, ignitron I-3, winding W2, winding W1, ignitron I-2, contact FK1 to bus L1. Current now builds up in winding W1 in a direction from the neutral to its terminal and current in winding W3 decays.

Ignitron I-5 is the next to conduct, and it conducts after ignitron I-6 becomes non-conductive. Current then flows from bus L3 through ignitron I-5, windings W3 and W1, ignitron I-2, contact FK1 to bus L1. Current flowing from the terminal to the neutral builds up in winding W3 and the current in winding W2 decays.

Ignitron I-4 is the next to conduct, and it conducts after I-3 becomes non-conductive. Current then flows from bus L3 through ignitron I-5, winding W3, winding W2, ignitron I-4, contact FK2 to bus L2.

Finally, ignitron I-1 conducts again after ignitron I-2 becomes non-conductive and current flows from bus L1 through contact FK1, ignitron I-1, windings W1 and W2, ignitron I-4, contact FK2 to bus L2.

A complete cycle of conduction of the ignitrons has now been completed. The ignitrons now continue to conduct in the above-described succession, and a reduced polyphase alternating voltage depending on the setting of the phase shift circuits PH is impressed on motor M.

Assuming that motor M is operating under load, its speed gradually increases and as it increases, the output of the tachometer generator G increases. Eventually sufficient current is supplied to relay 1RT to energize it so that it closes its contacts 1TK2 through 1TK6 in the firing circuits FC1 through FC6. One of the resistors RP1 in each firing circuit (FC1 through FC6) is now shunted out and the phase of the firing potential is advanced. The output of the ignitrons I-1 through I-6 is now increased so that motor M is accelerated and its speed increases further. At a still higher speed of the motor, the relay 2RT is actuated closing all of its contacts 2TK1 through 2TK6 and shunting out the other resistors RP2 in the firing circuits FC1 through FC6 of the ignitrons. The phase of the firing of the ignitrons is now further advanced and the ignitrons now operate in such manner as to supply substantially the full power to the motor. The motor is now operating at full speed and at the power factor corresponding to the full speed operation which is determined by the setting of the variable resistor RP in the circuits PH.

It is to be noted that in certain situations in accordance with our invention, the fixed resistors which are shunted out by the relays 1RT and 2RT are unnecessary as the voltage initially supplied to motor M is sufficiently reduced for starting purposes by the setting of the variable resistor. As has been explained, this resistor is set to correspond to the running power-factor of motor M.

As motor M now rotates, the limit switches L-5 and L-6 close. These switches shunt the presently closed contacts 67 and 69 of the relay RR so that the operation is now independent of this relay, and the starting relay SR remains locked in through the contacts L-5 and L-6 independently of the relay RR. Next, the limit switches L-3 and L-4 close. A holding circuit for the relay RM is now closed through switch L-3 which is independent of relay RR. This circuit extends from the auxiliary bus AL1 through the conductor 97, the stop button BZ, contact S3, the conductor 99, contact L-3, the now closed contact 75 of relay RM, the now closed contact 41 of relay RC, the conductor 113, the coil of relay RM, the now closed contact 81 of relay RM, the conductor 103, contact S4 to bus AL2. Next contacts L-1 and L-2 open. The opening of these contacts assures that relay RA2 which is locked in through them becomes deenergized and drops out. Relay RR which is energized through the contacts 63 and 65 of relay RA1 also drops out and remains out regardless of the position of the run button BR. Motor M is thus prevented from going through more than one cycle of operation. Eventually, contacts L-5 and L-6 open and starting relay SR becomes deenergized and drops out. The supply of firing current to the ignitrons I-1 through I-6 is now interrupted and after the last two of the ignitrons to conduct has stopped conducting, the supply of power to motor M is stopped. A short time after switches L-5 and L-6 open, switches L-3 and L-4 open and now relay RM is deenergized. The braking solenoid and the timer relay are now deenergized and motor M is stopped. Thereafter, the limit contacts L-1 and L-2 reclose setting the system for a new operation.

If the operator releases the run button BR just after the contacts L-3 and L-4 close, but before the contacts L-1 and L-2 open, relay RA2 remains energized through contacts L-1 and L-2 and becomes deenergized when these contacts open. Once relay RA2 has been deenergized, the run button must be again pressed to repeat a cycle of operation.

*Standby—Continuous*

When the selector switch is set for continuous operation, contacts S3, S4, S5, S6, S7 and S8 are closed, and contacts S1 and S2 are open. Under these circumstances, relays RC, RA1 and RA2 of selector switch SS and contactor KF are energized as described with reference to the single cycle operation. In the case, however, the limit switch LS is ineffective because its contacts are shunted out at the contacts S5, S6, S7 and S8 of the selector switch SS.

*Operation—Continuous*

To start continuous operation, the run button BR is pressed. Relay RA1 is then deenergized and drops out reopening its normally open contacts 51 and 53, but relay RA2 is not affected because it remains locked in through its now closed contacts 59 and 61.

Relay RR is energized in a circuit extending from the bus AL1 through the conductor 97, the stop button BZ, contact S3, the conductors 99 and 101, the now closed contact 32 of the run button, the now reclosed contact 55 of relay RA1, the now closed contact 63 of relay RA2, the coil of relay RR, the now closed contact 65 of relay RA2, the now reclosed contact 57 of relay RA1, the conductor 103, contact S4 to bus AL2.

As during the single cycle operation, relay RM, the timer relay RT and the starting relay RS, are energized in sequence. Relay RM is now locked in through contact S5 in a circuit extending from the bus AL1 through conductor 97, the stop button BZ, contact S3, contact S5, the now closed contact 75 of relay RM, the now closed contact 41 of relay RC, the coil of relay RM, another now closed contact 81 of relay RM, contact S4, to the bus AL2.

When relay RS is energized, the firing circuits FC1 through FC6 for the ignitrons I-1 through I-6 are rendered effective and the ignitrons conduct in the manner explained above. The conduction is initially at a relatively low voltage because the fixed resistors RP1 and RP2 are connected in the phase shifting circuits PH. As the speed of motor M increases, the relay 1RT and 2RT are actuated, increasing the voltage impressed on the motor until it is operating at full speed and at full voltage.

The release of run button BR does not affect the operation of motor M because the relay RM remains energized independently of the run button through its own now closed contacts and through the contacts of relay RC. The latter is energized independently of the run button BR through contacts S3 and S4.

The operation of the motor may be stopped by opening the stop button BZ through which both relay RM and RC are locked in. Operation of this stop button causes relay RM to be deenergized and drop out, opening at its now open contacts 77 and 79 the circuits through the brake solenoid SB, the timer relay RT, and the starting relay RS.

Standby—Inch

When the selector switch SS is set for inch operation, only contacts S1, S2, S7 and S8 are closed and the others are open. Under these circumstances, relays RC, RA1 and RA2 are deenergized and the operation is only through the relay RM or through the reversing relay RV, depending on whether the inch forward BF or the inch reverse BV is closed.

Operation—Inch

To inch the motor forward, the inch forward button BF is actuated, opening its normally closed contact 37 to lock out the inch reverse button BV and closing its normally open contact 34. A circuit is now closed through relay RM which extends from bus AL1 through the conductor 97, the stop button BZ, contact S1, a conductor 141, normally closed contact 143 of an auxiliary relay RA3, a conductor 145, the now closed contact 34 of the inch forward button BF, the normally closed contact 38 of the inch reverse button BV, the exciting coil of relay RM, the conductor 115, contact S2 to bus AL2. Relay RM now closes but it is not locked in, since contacts S3 through S6 are open.

When relay RM is actuated, its lower contacts 147 and 149 close, closing the energizing circuit to the forward contactor KF, and conditioning the power supply unit to supply motor M. In addition, the brake solenoid SB and the timer relay RT are energized in a circuit extending from the bus AL1 through now closed contact 77, the conductor 117, the exciting coil of relay RT, and the solenoid SB, the conductor 119, the now closed contact 79 of relay RM, the conductor 121 to the bus AL2. The timer relay RT picks up after it times out and through its upper now closed contact 83, it energizes the starting relay RS and the auxiliary relay RA3. Relay RS is energized in a circuit extending from bus AL1 through the now closed contact 77 of relay RM, the conductor 117, contact S7, the conductors 123 and 125, the now closed contact 83 of relay RT, the conductor 127, the exciting coil of relay RS, the conductor 129, the conductor 131, the contact S8, the conductor 133, now closed contact 79 of relay RM, the conductor 121 to bus AL2. The circuit through the coil of relay RA3 is closed similarly through the normally closed contact of relay RC which connects this coil between the conductors.

Relay RS is now actuated, rendering effective the firing circuits FC1 through FC6 for the ignitrons I-1 through I-6 and the latter conduct. The normally closed contact 143 of relay RA3 is opened, but relay RM remains locked in through the now closed contact 35 of the timer relay RT and through the inch forward button BF.

Motor M is now operated at reduced voltage and moves until the inch forward button is opened. When this button is opened, the relay RM and the relays, RT, RS and RA3 and brake solenoid SB are deenergized and the movement of motor M is stopped. Motor M is inched at a reduced voltage because the fixed resistors RP1 and RP2 remain connected in the circuit. If the inch forward button BF should be held closed an excessively long time, one or both of the relays 1RT or 2RT would close, reducing the resistance in each phase shift circuit PH and increasing the power supply to the motor.

Repeated closing of the inch forward button BF repeats the above-described process and motor M is inched forward as described.

To reverse the motor, the inch reverse button BV is actuated, opening the normally closed contact 38 in circuit with the inch forward button BF and thus locking out the inch forward button and closing its normally opened contact 36. When the normally open contact 36 closes, a circuit is completed through the coil of reversing relay RV which extends from the bus AL1 through the conductor 97, the stop button BZ, the contact S1, the conductor 141, the contact 143 of relay RA3, the conductor 145, the normally closed contact 37 of the inch forward button BF, the now closed contact 36 of the inch reverse button BV, the coil of relay RV, a conductor 151, contact S2 to bus AL2. Relay RV is now actuated and at its lower now closed contacts 91 and 93 closes the energizing circuit for the reversing contactor KF. The reversing contacts RK1 and RK2 are now closed and motor M is conditioned to operate in a reverse direction.

At its now closed contacts 87 and 89, the reversing relay RV closes a circuit through the coil of relay RT and through the brake solenoid SB. This circuit extends from the bus AL1 through the now closed contact 87 of the reversing relay RV, the conductors 117 and 153, the coil of relay RT and the solenoid SB, the conductors 119 and 133, the now closed contact 89 of relay RV, the conductor 121, to the bus AL2. The brake solenoid SB is energized and after a predetermined time interval, relay RT is actuated. This relay closes a circuit through the coil of starting relay RS which extends from the bus AL1 through conductor 155, the now closed contact 87 of the reversing relay RV, contact S7, the conductors 123 and 125, the now closed contact 83 of relay RT, the conductor 127, the exciting coil of relay RS, the conductors 129 and 131, contact S8, the conductor 133, the now closed contact 89 of reversing relay RV, the conductor 121 to bus AL2. Relay RA3 is energized in a similar circuit through the normally closed contact 49 of relay RC. The normally closed contact of relay RA3 opens, but the circuit through the exciting coil of relay RV remains closed through the now closed contact 85 of the timer relay RT.

When the starting relay RS is actuated, the firing circuits FC1 through FC6 for the ignitrons become effective and motor M is supplied at a reduced voltage. Since the reversing contacts RK1 and RK2 are closed, the motor is operated in a reverse direction so long as the inch reverse switch remains closed. Once the inch reverse button BV is opened, the relay RV is deenergized and the operation of motor M is stopped. Again if the inch reverse button BV remains closed for a substantial time interval, one or both of the relays 1RT and 2RT operate and the voltage impressed on motor M is increased.

*Description Figure 5*

In the apparatus shown in Figs. 1A to 1D, the phase shift circuits PH for motor M is controlled by a tachometer generator, the output of which depends on the speed of the motor. This mode of control in accordance with our invention is particularly useful for a system in which motor M starts under load, and the increase in speed of motor M is dependent on the load. Since it is desirable that the relays 1RT and 2RT operate as the motor reaches certain speeds, the tachometer generator G which responds to the speed is introduced for the purpose of acting the relays.

It frequently happens that a motor starts under no load and when it reaches full speed, is applied to the load. Such a motor is said to deliver a power stroke and is encountered particularly in motors which drive directly a mechanical press particularly of the type used in forming automobile bodies.

A motor which rises to its full speed under zero load reaches certain of its speeds at predetermined time intervals after starting. In operating such a motor, the relays 1RT and 2RT may be controlled from a timer rather than from a tachometer. A system of this type is shown in Fig. 5.

This system is similar to that disclosed in Figs. 1A to 1D including a polyphase motor M, an electronic power unit and a starting unit. The motor M, and the starting unit are so similar to those disclosed in Figs. 1A to 1D. The electronic power unit of Fig. 5 is also the same except that in place of the tachometer G, this unit includes a timer T from which the relays 1RT and 2RT are actuated. This timer may be of the electronic or mechanical type, and may be of rather simple structure. The system also includes a starting relay RS1 which differs from the starting relay RS of Figs. 1A through 1D in the fact that it includes in addition to the six contacts of the relay RS, an additional normally open contact SKT, which on closing energizes the timer T to start its timing operation.

*Operation Figure 5*

The operation of the Figure 5 system is similar to that of Figs. 1A to 1D. The selector switch of the starting circuit may be set for single cycle, continuous, or inch operation. Whatever the setting, once relay RM is actuated, relay RS1 is actuated. The latter relay not only closes the supply circuits for the firing capacitors C, but also energizes the timer T starting the timing operation.

The closing of the supply circuits for the firing capacitors renders the firing circuits for the ignitrons I–1 through I–6 conductive and the latter conduct initially driving motor M at reduced voltage. At the same time, the timing operation starts. After a predetermined time interval, when motor M has reached a predetermined speed, relay 1RT is actuated shunting out one fixed resistor RP1 in each phase shift circuit PH. After another time interval when motor M has reached a still higher speed, relay 2RT is actuated shunting out the second resistor RP2 in each of the phase shift circuits. Motor M now reaches full speed and full voltage is applied in accordance with the setting of the variable resistor RP.

When the motor is to be deenergized, the relay RM in the starting circuit is deenergized and relay RS1 is deenergized. The timer T is then reset and relays 1RT and 2RT drop out.

*Conclusion*

It is seen that we have provided a system in which a motor is started automatically at reduced voltage whether it is to be operated for single cycles, continuously or in inch. This system includes facilities for increasing the voltage applied to the motor as its speed increases.

The objects of our invention are accomplished in the embodiments disclosed by a pair of resistors RP1 and RP2 which are shunted out in succession. Only two resistors are shown for illustrative purposes. Naturally a larger number of such resistors may be provided. The magnitudes of these resistors are not discussed in any detail. They may all be of the same magnitude or they may have substantially different magnitudes depending on the rate at which it is desirable to accelerate the motor.

Our invention is herein shown as including a Y connected motor M and the power circuit disclosed is similar to that shown in Fig. 1 of the above-mentioned parent application. Our invention in its broader aspects is applicable to motors connected in other ways, for example, as is shown in Figs. 2, 3 and 5 of the above-mentioned parent application.

While we have shown certain specific embodiments of our invention, many modifications thereof are possible. Our invention therefore, is not to be limited except insofar as is necessitated by the prior art and by the spirit thereof.

We claim as our invention:

1. In combination a polyphase motor having a plurality of phase windings each winding having a pair of terminals; a plurality of supply conductors corresponding in number to the phases of said motor and each adapted to be connected to a phase of a polyphase source; a pair of electric discharge paths each defined by an anode and a cathode and having a control electrode associated with each of said supply conductors; means for connecting said anodes and cathodes of each of said pairs in antiparallel between its associated supply conductor and one terminal of an associated phase winding of said motor, means for interconnecting the remaining terminals of said windings; means connected between the control electrode and the cathode of each said path for rendering said path conductive at a predetermined instant in a half period of said source, said means being set to render each corresponding path conductive late in a half period of said source when power is first applied to said motor and means actuable as said motor gains speed to render each said path conductive substantially earlier in the half period of said source.

2. In combination an $n$ phase motor having $n$ phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and cathodes of each of said pairs in anti-parallel between its associated supply conductor and one terminal of an associated winding of said motor; means for interconnecting the remaining terminals of said windings, a circuit for controlling the conductivity of each of said paths connected between the control electrode and the cathode of said path, each said circuit including means, normally effective to prevent its corresponding path from becoming conductive during any half period of said source until an instant late in said half period, and means for rendering said corresponding path conductive substantially earlier in said half period when said preventing means is ineffective; and means actuable as the speed of said motor increases for rendering said preventing means ineffective.

3. In combination an *n* phase motor having *n* phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and cathodes of each of said pairs in antiparallel between its associated supply conductor and one terminal of an associated winding of said motor; means for interconnecting the remaining terminals of said windings; a circuit for controlling the conductivity of each of said paths connected between the control electrode and the cathode of said path, each said circuit including means normally effective to prevent its corresponding path from becoming conductive during any half period of said source until an instant late in said half period, and means for rendering said corresponding path conductive substantially earlier in said half period when said preventing means is ineffective; and means responsive to the speed of said motor for rendering said preventing means ineffective.

4. In combination an *n* phase motor having *n* phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and cathodes of each of said pairs in anti-parallel between its associated supply conductor and one terminal of an associated winding of said motor; means for interconnecting the remaining terminals of said windings, a circuit for controlling the conductivity of each of said paths connected between the control electrode and the cathode of said path, each said circuit including means normally effective to prevent its corresponding path from becoming conductive during any half period of said source until an instant late in said half period, and means for rendering said corresponding path conductive substantially earlier in said half period when said preventing means is ineffective; and timing means actuable a predetermined time interval after the motor has been energized for rendering said preventing means ineffective.

5. In combination an *n* phase motor having *n* phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and cathodes of each of said pairs in anti-parallel between its associated supply conductor and one terminal of an associated winding of said motor; means for interconnecting the remaining terminals of said windings, a circuit for controlling the conductivity of each of said paths connected between the control electrode and the cathode of said path, each said circuit including means normally effective to prevent its corresponding path from becoming conductive during any half period of said source until an instant late in said half period, and means for rendering said corresponding path conductive substantially earlier in said half period when said preventing means is ineffective; said preventing means having a plurality of settings for setting said instant over a predetermined range during said half period, and timing means actuable at successive time intervals after the motor has been energized to change the settings of said preventing means to render each said path conductive progressively earlier during the half periods of said source.

6. In combination an *n* phase motor having *n* phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and the cathodes of each of said pairs in antiparallel between the associated supply conductor and one terminal of an associated phase winding; means for interconnecting the remaining terminals of said windings; a circuit for controlling the conductivity of each of said paths connected between the control electrode and the cathode of said path, said circuit including means having a plurality of settings in each of which said path is prevented from being rendered conductive until a predetermined instant different for each setting, in any half period of said source, said circuits being set for all said paths, when said motor is initially energized, in a setting in which said paths are prevented from becoming conductive until late in the half periods of said source; and means actuable as the speed of said motor increases for resetting said preventing means to permit said paths to be rendered conductive earlier in said half periods.

7. In combination an *n* phase motor having *n* phase windings each winding having a pair of terminals; *n* supply conductors adapted to be connected to the phases of an *n* phase source; *n* pairs of electric discharge paths, each path being defined by an anode and a cathode and having a control electrode and each pair being associated with one of said supply conductors; means for connecting the anodes and the cathodes of each of said pairs in antiparallel between the associated supply conductor and one terminal of an associated phase winding; means for interconnecting the remaining terminals of said windings; a circuit for controlling the conductivity of each of said paths connected between the control electrode and the cathode of said path, said circuit including means having a plurality of settings in each of which said path is prevented from being rendered conductive until a predetermined instant, different for each setting, in any half period of said source, said circuits being set for all said paths, when said motor is initially energized, in a setting in which said paths are prevented from becoming conductive until late in the half periods of said source; and means responsive to the speed of said motor and actuable as the speed of said motor increases for progressively resetting said preventing means to permit said paths to be rendered conductive progressively earlier in said half periods.

8. In combination an $n$ phase motor having $n$ phase windings each winding having a pair of terminals; $n$ supply conductors adapted to be connected to the phases of an $n$ phase source; $n$ pairs of electric discharge paths, each path being defined by an anode and a cathode and having a control electrode and each pair being associated with one of said supply conductors; means for connecting the anodes and the cathodes of each of said pairs in antiparallel between the associated supply conductor and one terminal of an associated phase winding; means for interconnecting the remaining terminals of said windings; a circuit for controlling the conductivity of each of said paths connected between the control electrode and the cathode of said path, said circuit including means having a plurality of settings in each of which said path is prevented from being rendered conductive until a predetermined instant, different for each setting, in any half period of said source, said circuits being set for all said paths, when said motor is initially energized, in a setting in which said paths are prevented from becoming conductive until late in the half periods of said source; means actuable as the speed of said motor increases for resetting said preventing means to permit said paths to be rendered conductive earlier in said half periods, and selective means connected to said circuits for actuating said circuits to drive said motor continuously or to inch said motor.

9. Apparatus according to claim 6 characterized by the fact that each circuit includes one setting in which the paths are prevented from becoming conductive until an instant in any half period of the source which is substantially later than the instant in said half period corresponding to the lowest power-factor at which the motor operates.

10. In combination an $n$ phase motor having $n$ phase windings, each winding having a pair of terminals; $n$ supply conductors adapted to be connected to the phases of an $n$ phase source; $n$ pairs of electric discharge paths, each path being defined by an anode and a cathode and having a control electrode and each pair of being associated with one of said supply conductors; means for connecting the anodes and cathodes of each of said pairs in antiparallel between its associated supply conductor and one terminal of an associated winding of said motor; means for interconnecting the remaining terminals of said windings; and a circuit for controlling the conductivity of each of said paths connected between the control electrode and the cathode of said path, each said circuit including means for preventing said path from becoming conductive during any half period of said source until an instant corresponding to the normal running power-factor of said motor.

11. In combination an $n$ phase motor having $n$ phase windings, each winding having a pair of terminals; $n$ supply conductors adapted to be connected to the phases of an $n$ phase source; $n$ pairs of electric discharge paths, each path being defined by an anode and a cathode and having a control electrode and each pair being associated with one of said supply conductors; means for connecting the anodes and cathodes of each of said pairs in antiparallel between its associated supply conductor and one terminal of an associated winding of said motor; means for interconnecting the remaining terminals of said windings, a circuit for controlling the conductivity of each of said paths connected between the control electrode and the cathode of said path, each said circuit including means for preventing said path from becoming conductive during any half period of said source until an instant corresponding to the normal running power-factor of said motor; and selective starting means connected to said circuits for actuating said circuits to operate said motor continuously or to inch said motor.

12. In combination a heavy-duty motor; a power unit for said motor including controllable electric discharge devices and means to be actuated for rendering said discharge devices conductive, said rendering means being so set in its quiescent state that said discharge devices are initially adapted to operate at reduced conductivity; means adapted to interpose said power unit electrically between said motor and a power source so that said motor is supplied from said source through said discharge devices; and a starting unit for said motor connected to said power unit for actuating said rendering means, said starting unit including means for actuating said rendering means to operate said motor at the will of an operator for at least one cycle of operation or in inch; said power unit including means actuable as the speed of said motor increases for increasing the conductivity of said devices.

13. The combination according to claim 12 characterized by the fact that the actuable means includes a timer and by means included in the starting unit for starting the timing of said timer simultaneously with the actuating of said rendering means.

14. In combination a heavy-duty motor; a power unit for said motor including controllable electric discharge devices and means to be actuated for rendering said discharge devices conductive, said rendering means being so set in its quiescent state that said discharge devices are initially adapted to operate at reduced conductivity; means adapted to interpose said power supply unit electrically between said motor and a power source so that said motor is supplied from said source through said discharge devices; and a starting unit for said motor connected to said power unit for actuating said rendering means, said starting unit including means for actuating said rendering means to operate said motor at the will of an operator for at least one cycle of operation or in inch; said power unit including means responsive to the speed of said motor and actuable as the speed of said motor increases for increasing the conductivity of said devices.

WILLIAM E. LARGE.
ROBERT F. BARRELL.

No reference cited.